US006642184B1

(12) United States Patent
De Ridder

(10) Patent No.: US 6,642,184 B1
(45) Date of Patent: Nov. 4, 2003

(54) ORGANOSILICON COMPOSITION

(75) Inventor: Lucrece De Ridder, Gent (BE)

(73) Assignee: Dow Corning S.A., Seneffe (BE)

( * ) Notice: Subject to any disclaimer, the term of this patent is extended or adjusted under 35 U.S.C. 154(b) by 0 days.

(21) Appl. No.: 09/980,596

(22) PCT Filed: May 26, 2000

(86) PCT No.: PCT/EP00/04917

§ 371 (c)(1),
(2), (4) Date: Nov. 14, 2001

(87) PCT Pub. No.: WO00/73376

PCT Pub. Date: Dec. 7, 2000

(30) Foreign Application Priority Data

May 28, 1999 (GB) ............................................. 9912653

(51) Int. Cl.⁷ ............................. C09K 3/00; F21B 33/13
(52) U.S. Cl. ........................ 507/233; 507/234; 166/292; 166/295
(58) Field of Search ................................ 507/233, 234; 166/292, 295; 528/15, 20; 525/474, 478

(56) References Cited

U.S. PATENT DOCUMENTS

| 3,344,111 A | 9/1967 | Chalk |
| 3,418,731 A | 12/1968 | Anciaux |
| 3,445,420 A | 5/1969 | Kootkootsedes et al. |
| 3,882,083 A | 5/1975 | Berger et al. |
| 3,989,667 A | 11/1976 | Lee et al. |
| 4,043,977 A | 8/1977 | de Montigny et al. |
| 4,061,609 A | 12/1977 | Bobear |
| 4,256,870 A | 3/1981 | Eckberg |
| 4,337,332 A | 6/1982 | Melancon et al. |
| 4,347,346 A | 8/1982 | Eckberg |
| 4,465,818 A | 8/1984 | Shirabata et al. |
| 4,472,563 A | 9/1984 | Chandra et al. |
| 4,476,166 A | 10/1984 | Eckberg |
| 4,562,096 A | 12/1985 | Lo et al. |
| 4,774,111 A | 9/1988 | Lo |
| 4,787,453 A | * 11/1988 | Hewgill et al. ............. 166/295 |
| 5,629,387 A | * 5/1997 | Frances et al. ............. 525/478 |

FOREIGN PATENT DOCUMENTS

| FR | 0622420 | 11/1994 |
| WO | WO94/00672 | 1/1994 |
| WO | WO99/43923 | 9/1999 |

* cited by examiner

Primary Examiner—Philip Tucker
(74) Attorney, Agent, or Firm—McKellar Stevens; Robert L. McKellar

(57) ABSTRACT

The present invention relates to use of an inhibitor compound in an organosilicon composition for inhibiting curing of the organosilicon composition by a hydrosilylation reaction at a temperature of 40° C. to 100° C., or 100° C. and above, and a pressure of $1 \times 10^6$ N/m² to $5 \times 10^6$ N/m², or $5 \times 10^6$ N/m² and above. In a preferred application the organosilicon composition cures to form a silicone gel or elastomeric seal or plug within an oil or gas well. Preferred inhibitor compound is 1-ethynyl-1-cyclopentanol or 1-ethynyl-1-cyclohexanol.

7 Claims, No Drawings

ORGANOSILICON COMPOSITION

The present invention relates to use of inhibitor compounds, in particular inhibitor compounds suitable for inhibiting curing of an organosilicon composition by a hydrosilylation reaction. More particularly, the present invention relates to the use of inhibitor compounds for inhibiting curing of an organosilicon composition by a hydrosilylation reaction under extreme environmental conditions.

Many organosilicon compositions cure by a hydrosilylation reactions, in which a transition metal containing catalyst, for example a platinum group containing compound or complex, is used to catalyse a hydrosilylation reaction, typically between olefinic groups of a siloxane polymer containing aliphatic unsaturation and hydrogen atoms of a cross-linker compound containing silicon-bonded hydrogen atoms. Inhibitor compounds are used to inhibit the transition metal catalyst from catalysing the hydrosilylation reaction and hence inhibit curing of the organosilicon composition, for example to reduce cure rate and/or extend pot life of the organosilicon composition. Such inhibitors are well known in the art and are commercially available. Examples of these inhibitors include unsaturated organic compounds such as ethylenically or aromatically unsaturated amides (eg see U.S. Pat. No. 4,337,332), acetylenic compounds (U.S. Pat. Nos. 3,445,420 and 4,347,346), ethylenically unsaturated isocyanates (U.S. Pat. No. 3,882,083), olefinic siloxanes (U.S. Pat. No. 3,989,667), unsaturated hydrocarbon diesters (U.S. Pat. Nos. 4,256,870, 4,476,166 and 4,562,096), conjugated ene-ynes (U.S. Pat. Nos. 4,465,818 and 4,472,563, hydroperoxides (U.S. Pat. No. 4,061,609), ketones (U.S. Pat. No. 3,418,731), sulphoxides, amines, phosphines, phosphates, nitriles (U.S. Pat. No. 3,344,111), diaziridines (U.S. Pat. No. 4,043,977), acetylinic alcohols (U.S. Pat. No. 3,445,420), unsaturated carboxylic esters (U.S. Pat. No. 4,256,870), maleates and fumarates (U.S. Pat. Nos. 4,562,096 and 4,774,111). Organosilicon compositions which contain an inhibitor may be cured by raising the temperature of the composition to the boiling point of the inhibitor, thus evaporating the inhibitor and allowing the hydrosilylation catalyst to catalyse the hydrosilylation reaction and hence cure the organosilicon composition.

Silicones have characteristics which make them particularly useful in applications where extreme environmental conditions exist, for example their high resistance to heat and chemical attack. For example, WO 99/43923 discloses a method for carrying out well construction, repair and/or abandonment operations which comprises using an addition-curing silicone formulation. However, a problem with the use of commercially available silicones in extreme environmental conditions such as these is that the conditions may cause the organosilicon composition to cure en route to the desired location, for example in an oil well, which causes blockages within the pumps, pipework and other equipment used to get the organosilicon composition to the desired location.

The present inventors have found that conventional inhibitors suitable for inhibiting curing of organosilicon compositions by a hydrosilylation reaction can be used to reduce the cure rate of an organosilicon composition in conditions of elevated temperature and pressure sufficiently to enable arrival of the organosilicon composition at a desired location substantially uncured.

According to the present invention there is provided use of an inhibitor compound in an organosilicon composition for inhibiting curing of the organosilicon composition by a hydrosilylation reaction at a temperature of from 40° C. to 100° C., or 100° C. and above, and a pressure of $1 \times 10^6$ N/m² to $5 \times 10^6$ N/m², or $5 \times 10^6$ N/m² and above.

The cure time for a particular organosilicon composition used in the present invention will depend upon the particular composition in question and the severity of the cure conditions. However, typical cure times may be the order of 4 to 12 hours. By way of comparison, the same organosilicon composition without a cure inhibitor will cure in minutes.

In a preferred application, the organosilicon composition cures to form a silicone gel or elastomeric seal or plug within an oil or gas well.

Any inhibitor compound may be used in the organosilicon composition which is effective at inhibiting curing of the organosilicon composition by a hydrosilylation reaction. Such inhibitors are commercially available and are referred to hereinabove. Preferred inhibitor compounds include aromatic alcohols, alkynyl alcohols and their derivatives, methylvinylcyclosiloxanes, and fumarates and maleates. Examples of suitable aromatic alcohols include benzyl alcohol, 1-phenyl-1-butanol, and 4-phenyl-1-butanol. Examples of suitable alkynyl alcohols and their derivatives include, 1-ethynyl-1-cyclopentanoly, 1-ethynyl-1-cyclohexanol, 2-methyl-3-butyn-2-ol, 2,5-dimethyl-3-hexyne-2,5-diol, 2,7-dimethyl-3-5-octadiyne-2, 7-diol, 3-methyl-1-pentyn-3-ol, 3,5-dimethyl-1-hexyn-3-ol, 2,4,7, 9-tetramethyl-5-decyne-4, 7-diol, 1,4-Bis (1'hydroxycyclohexyl)-1,3-butadiyne, 1-(1-butynyl) cyclopentanol, 2,5-dimethyl-5-hexen-3-yn-2-ol, 5-dimethylamino-2-methyl-3-pentyn-2-ol, 3,4,4-trimethyl-1-pentyn-3-ol, 3-isobutyl-5-methyl-1-hexyn-3-ol, 2,5,8-trimethyl-1-nonen-3-yn-5-ol, 1-(1-propyny) cyclohexanol, 3-4dimethyl-1-pentyn-3,4-diol, 2,3,6,7-tetramethyl-4-octyn-3,6-diol, and 4-ethyl-1-octyn-3-ol; examples of methylvinyl cyclosiloxanes include tetramethylvinylcyclotetrasiloxane and pentamethylvinylcyclopentasiloxane, and examples of fumarates and maleates include diethyl fumarate and diethyl maleate respectively. Particular preferred inhibitors are 1-ethynyl-1-cyclopentanol and 1-ethynyl-1-cyclohexanol.

The inhibitor is preferable present in the organosilicon composition in an amount of from 1 to 10 wt. %, more preferable from 2 to 5 wt. %.

The organosilicon composition may comprise a siloxane polymer having aliphatic unsaturation, an organosilicon cross-linker having Si—H functionality and a catalyst. Preferably the siloxane polymer is a linear polyorganosiloxane having the general structure (I)

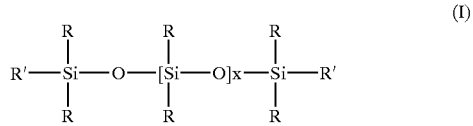

wherein R is a monovalent hydrocarbon group having up to 18 carbon atoms, R' is a monovalent hydrocarbon group having up to 6 carbon atoms or a hydrogen atom, and x is an integer, for example having a value of from 10 to 1500. It is particularly preferred that R denotes an alkyl or aryl group having from 1 to 8 carbon atoms, eg methyl, ethyl, propyl, isobutyl, hexyl, phenyl or octyl. More preferably at least 50% of all R groups are methyl groups, most preferably substantially all R groups are methyl groups. R' is preferably selected from an aliphatically unsaturated hydrocarbon group or a hydrogen atom. More preferably R' denotes an alkenyl group having up to 6 carbon atoms, more preferably vinyl, allyl or hexenyl suitable for hydrosilylation reactions.

The organosilicon cross-linker is preferably selected from silanes, low molecular weight organosilicon resins and short chain organosiloxane polymers. The cross-linker compound has silicon-bonded substituents which are capable of reacting with the silicon-bonded aliphatically unsaturated hydrocarbon groups or hydrogen atoms R' of the siloxane polymer described above. Where the group R' in the polymer is an alkenyl group, it is preferred that the reactive substituents on the cross-linking organosilicon compound are hydrogen atoms, allowing a hydrosilylation reaction between the cross-linking organosilicon compound and the polyorganosiloxane according to the general reaction scheme (I), wherein R" is a divalent hydrocarbon group and y is 0 or 1.

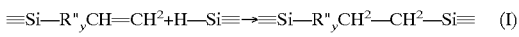

$\equiv$Si—R"$_y$CH=CH$^2$+H—Si$\equiv$→$\equiv$Si—R"$_y$CH$^2$—CH$^2$—Si$\equiv$ (I)

Suitable organosilicon cross-linking compounds include organosilicon resins consisting mainly of tetrafunctional siloxane units of the formula $SiO_{4/2}$ and monofunctional units $R_vR^o{}_wSiO_{1/2}$, where in R is as defined above, $R^o$ denotes a silicon-bonded substituent which may react with the silicon-bonded aliphatically unsaturated hydrocarbon groups or hydrogen atoms R' as discussed above, v and w each have a value of from 0 to 3, the sum of v+w being 3. Suitable short chain organosiloxane polymers include short chain organosiloxanes having at least 3 silicon-bonded hydrogen atoms per molecule, eg trimethylsiloxane endblocked methylhydrogensiloxane and dimethylmethylhydrogensiloxane having up to 20 carbon atoms, and methylhydrogencyclosiloxanes.

In addition to the siloxane polymers and the organosilicon cross-linking compounds, the organosilicon composition may also include a suitable catalyst for the hydrosilylation reaction, most preferably a Group VIII metal-based catalyst, eg platinum chloride, or compounds or complexes of platinum or rhodium.

The organosilicon composition may cure to a silicone gel or elastomer.

Other additional components may be included in the organosilicon composition, including fillers, densifiers, chain extenders, dyes, adhesion promoters, colorants, pigments, viscosity modifiers, bath-life extenders and flexibilisers. Suitable fillers include silica, eg fumed silica, precipitated silica, gel-formation silica, aerosols, titania, ground quartz, ground cured silicone rubber particles, calcium carbonate, and glass or thermoplastic microspheres. Suitable densifiers include iron powder, iron oxide, silica, carbonates, barium sulphate, and silver powder. If present, the filler is preferably pre-treated to make its surface hydrophobic, eg by treating with suitable silanes, short chain siloxanes, fatty acids or resinous silicone materials. Suitable materials and processes for rendering the surface of fillers hydrophobic have been described in the literature, and are known to the person skilled in the art.

A particularly preferred organosilicon composition comprises a polyorganosiloxane having 2 silicon-bonded alkenyl groups per molecule, preferably vinyl groups, a dimethylmethylhydrogensiloxane cross-linking compound, a platinum based catalyst, a 1-ethynyl-1-cyclopentanol or 1-ethynyl-1-cyclohexanol as inhibitor. The ratio of these components in the organosilicon composition is not critical, although it is preferred that the alkenyl-functional polyorganosiloxane polymer and the cross-linker having silicon-bonded hydrogen atoms are present in amounts which will ensure that at least one silicon-bonded hydrogen atom is present per alkenyl group, more preferably that the ratio would be from 1.1/1 to 5/1, most preferably from 2/1 to 4/1.

The organosilicon composition may be prepared as a one-part composition, or multi-part, eg two, three or four part composition. For example, in a two-part composition the first part comprises a siloxane polymer and catalyst, and the second part comprises an organosilicon cross linker and an inhibitor. In a four part composition, the first part will typically comprise a siloxane polymer and catalyst, the second part comprises an organosilicon cross linker, siloxane polymer and inhibitor, the third part comprises inhibitor and siloxane polymer, and the fourth part comprises filler. The parts are mixed, preferably in a 1:1 ratio, prior to use.

As mentioned hereinabove, in a preferred application of the present invention, the inhibitor is used to inhibit curing of the organosilicon composition with an oil or gas well, for example during well repair or abandonment applications. For example, the organosilicon composition may be pumped into the oil or gas well and allowed to cure to form a silicone elastomeric seal or plug, for example to seal an abandoned oil or gas well, or to repair a leaking well. Examples of oil or gas well applications in which the organosilicon composition may be used are water shut off, sand consolidation, primary cementing, and lateral sealing. The silicone elastomeric seal or plug may be used alone, or may be used in combination with a cementitious seal plug e.g. as a silicone-cement hybrid. Preferably, the organosilicon composition is in two part form, as described hereinabove, the two parts of which are mixed together prior to pumping.

In oil and gas well applications the organosilicon composition may need to be pumped hundred of meters down a well to reach the location where it is to cure to form a silicone seal or plug. Thus, lower viscosity organosilicon compositions are preferred to the corresponding higher viscosity compositions since they are easier to pump. Organosilicon compositions for use in these applications preferably have a viscosity in the range from 100 to 10000 mPa.s, more preferably 300 to 8000 mPa.s.

As mentioned hereinabove, the organosilicon compositions may be filled or unfilled, according to the particular properties required once cured. For example, an unfilled organosilicon composition can impregnate the rock formation surrounding a well bore to form on curing a base for additional plugs or seals. Alternatively, a filled organosilicon composition will cure to form a harder silicone elastomer than the corresponding unfilled organosilicon composition, which harder silicone elastomer is more suitable for use as a well plug or seal.

The present invention will now be illustrated by way of example (all percentages are by weight).

Example 1

An organosilicon composition was prepared in two parts as follows:

Part 1: 54 parts Quartz, 46 parts 3000 mm$^2$/s viscosity dimethylvinyl-terminated polydimethylsiloxane, and Pt (IV) complex catalyst in varying amounts (see Table 1 below).

Part 2: 46 parts Quartz, 46 parts 3000 mm$^2$/s viscosity dimethylvinyl-terminated polydimethylsiloxane, 6 parts 5 mm$^2$/s viscositytrimethyl-terminated dimethylmethylhydrogen-siloxane.

To Part 2 varying amounts of different cure inhibitors were added (see Table 1). In addition, a Comparative Example composition was prepared which contained no cure inhibitor.

For each composition, the ingredient materials for each Part are mixed together, and then equal amounts of each Part are mixed together. To determine the cure characteristics of the compositions under conditions of elevated temperature and pressure, 600 ml samples of each composition were tested using a Nowsco PC10 Cement Consistometer according to the American Petroleum Institute (API) test method 10A. The results are shown in Table 1 below.

"ETCH" means 1-ethynyl-1-cyclohexanol, "MBO" means 2-methyl-3-butyn-2-ol, "Mal" means diethylmaleate, and "Cycl" means tetramethylvinylcyclo-tetrasiloxane.

TABLE 1

| Temp. (° C.) | P. (bar) | Inhibit. | % Inhibit. | % Pt (IV) | Time (min) |
|---|---|---|---|---|---|
| 100 | 70 | NONE | NONE | 0.2 | 10 |
|  |  | ETCH | 1.0 |  | No cure |
|  |  |  | 0.5 |  | 840 |
|  |  |  | 0.2 |  | 210 |
| 135 | 225 |  | 2.0 |  | No cure |
|  |  |  | 1.5 |  | 259 |
|  |  |  | 0.1 |  | No cure |
| 100 | 200 |  | 0.3 | 0.2 | 488 |
|  | 250 |  |  |  | 417 |
|  | 500 |  |  |  | 458 |
| 130 | 70 | MBO | 0.8 | 0.2 | 180 |
|  |  |  | 0.9 |  | 305 |
| 135 | 225 |  | 1.0 | 0.2 | 93 |
|  |  |  | 1.5 |  | No cure |
| 100 | 100 | Mal | 0.5 | 0.2 | No cure |
| 130 | 200 |  | 1.0 |  | 69 |
| 130 | 225 | Cycl | 4.0 | 0.1 | 950 |
|  |  |  |  | 0.2 | 517 |
|  |  |  | 1.28 | 0.1 | 643 |
| 150 |  |  |  |  | No cure[1] |
|  |  |  |  |  | 249[2] |
| 135 | 250 |  | 0.12 | 0.1 | 1064[3] |
|  |  |  |  |  | 646 |

[1]Also contains 2.0% ETCH
[2]Also contains 1.5% ETCH
[3]Also contains 0.5% ETCH
[4]Also contains 0.25% ETCH

EXAMPLE 2

The same procedure as Example 1 above was followed with an organosilicon composition having the following composition:

Part 1: 46 parts iron powder, 24 parts Quartz, 21 parts 8000 mm$^2$/s viscosity dimethylvinyl-terminated polydimethylsiloxane, 9 parts barium sulphate, and Pt (IV) complex catalyst in varying amounts (see Table 2 below).

Part 2: 45 parts iron powder, 20 parts Quartz, 21 parts 8000 mm$^2$/s viscosity dimethylvinyl-terminated polydimethylsiloxane, 9 parts barium sulphate, 3 parts 5 mm$^2$/s viscosity trimethyl-terminated dimethylmethylhydrogen-siloxane, and ETCH in varying amounts (see Table 2).

TABLE 2

| Temp (° C.) | P. (bar) | % ETCH | % Pt (IV) | Time (min) |
|---|---|---|---|---|
| 140 | 380 | 1.55 | 0.2 | 991 |
|  |  | 1.4 |  | 78 |
|  |  | 0.75 | 0.1 | No cure |
|  |  | 0.6 |  | 144 |
| 130 | 310 | 1.25 |  | 641 |
|  |  | 1.05 |  | 267 |
| 80 | 150 | 0.054 | 0.2 | 344 |
|  | 250 | 0.1 |  | 527 |

EXAMPLE 3

The same procedure as Example 1 above was followed with an organosilicon composition having the following composition:

Part 1: 100 parts 390 mm$^2$/s viscosity dimethylvinyl-terminated polydimethylsiloxane, and Pt (IV) complex catalyst in varying amounts (see Table 2 below).

Part 2: 86 parts 390 mm$^2$/s viscosity dimethylvinyl-terminated polydimethylsiloxane, 11 parts 5 mm$^2$/s viscosity trimethyl-terminated dimethylmethylhydrogensiloxane, and ETCH in varying amounts (see Table 3).

TABLE 3

| Temp (° C.) | P. (bar) | % ETCH | % Pt (IV) | Time (min) |
|---|---|---|---|---|
| 135 | 225 | 0.8 | 0.43 | 75 |
|  |  | 1.5 |  | 125 |
|  |  | 2.5 |  | 190 |
|  |  | 3.0 |  | 480 |
|  |  | 0.95 | 0.2 | 168 |
|  |  | 1.0 |  | 215 |
|  |  | 1.3 |  | 307 |
|  |  | 1.4 |  | 320 |
|  |  | 1.5 |  | 323 |
|  |  | 1.55 |  | 324 |

What is claimed is:

1. A process for forming a silicone gel or elastomeric seal or plug within an oil or gas well by curing an organosilicon composition at a temperature of at least 40° C. and a pressure of at least 1×10$^6$ N/m$^2$ by a hydrosilylation reaction, characterised in that an inhibitor compound is incorporated in the organosilicon composition to inhibit curing of the organosilicon composition en route to the desired location.

2. A process according to claim 1, characterised in that the inhibitor is selected from the group consisting of aromatic alcohols, alkynyl alcohols and their derivatives, methylvinylcyclosiloxanes, and fumarates and maleates.

3. A process according to claim 2, characterised in that the inhibitor is selected from the group consisting of 1-ethynyl-1-cyclopentanol and 1-ethynyl-1-cyclohexanol.

4. A process according to claim 1, characterised in that the inhibitor is present in the organosilicon composition in an amount of from 2 to 5% by weight.

5. A process according to claim 1, characterised in that the organosilicon composition comprises a siloxane polymer having aliphatic unsaturation, an organosilicon cross-linker having Si—H functionality and a catalyst.

6. A process according to claim 1, characterised in that the organosilicon composition is cured at a temperature of at least 100° C.

7. A process according to claim 1, characterised in that the organosilicon composition is cured at a pressure of at least 5×10$^6$ N/m$^2$.

* * * * *